Inventor
William NAPIER
Derrick H. Ranford
By
Bailey, Stephens & Huettig
Attorneys

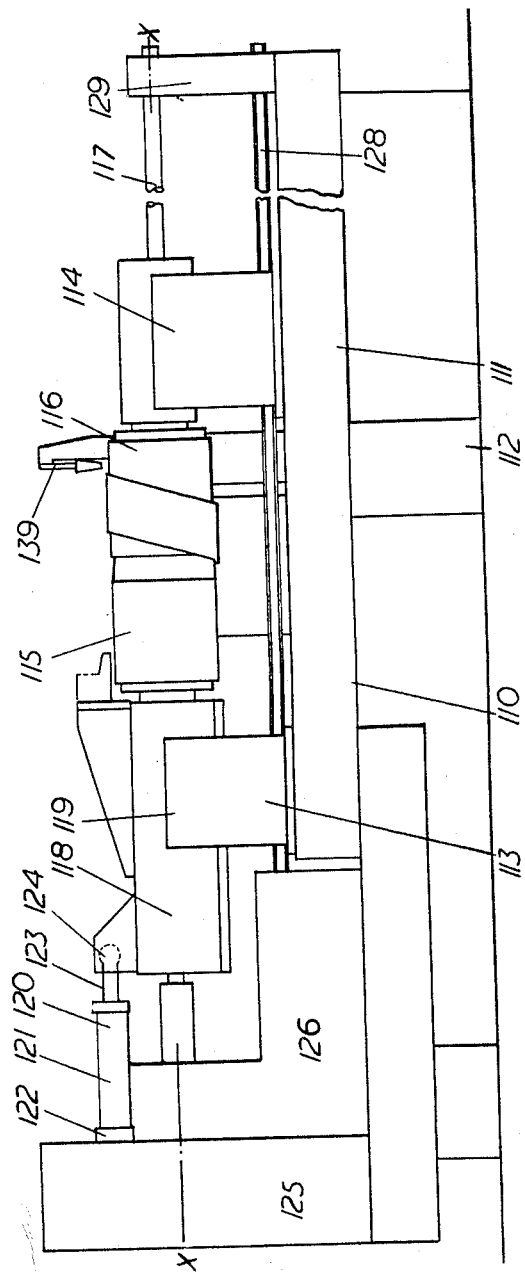

United States Patent Office 3,173,594
Patented Mar. 16, 1965

3,173,594
MAKING HELICALLY WELDED TUBES
William Napier and Derrick H. Ranford, Bristol, England, assignors to Bristol Aerojet Limited, Bristol, England, a British company
Filed Sept. 18, 1961, Ser. No. 138,685
Claims priority, application Great Britain, Sept. 21, 1960, 32,441/60
5 Claims. (Cl. 228—10)

The present invention concerns processes and apparatus which have been particularly developed for the manufacture of steel tubes for the casings of rocket motors. These tubes require to be made of steel of exceptionally high tensile strength and to a high standard of accuracy. Although their manufacture presents the same kind of problems as are present in the helical winding and welding of tubes from strip metal for general commercial use, it does so in a more extreme form because of the properties of the material used and the need for accuracy.

In a process according to the present invention a strip of metal is delivered to a headstock mandrel, led around the headstock mandrel and around a tailstock mandrel, and is anchored to the tailstock mandrel, the mandrels being coaxial cylinders of equal diameter, and the tailstock mandrel is then caused to rotate and also to move axially away from the headstock mandrel so that the strip is formed into a helix with the edges of successive turns adjacent to one another, while a continuous seam weld is progressively formed between the adjacent edges of the successive turns by a stationary welding device adjacent to the headstock.

Furthermore the headstock mandrel during the first few rotations of the tailstock mandrel is caused to move axially with the tailstock mandrel, and thereafter is held stationary in the axial direction.

The headstock mandrel may rotate freely or may be positively rotated at the same speed as the tailstock mandrel.

Although of particular value in connection with rocket motor casings, the invention may be used in the manufacture of tubular articles in general.

The accompanying drawings show examples of apparatus according to the present invention. In these drawings:

FIGURES 8 and 9 are a plan and side elevation of another apparatus.

Figure 1:
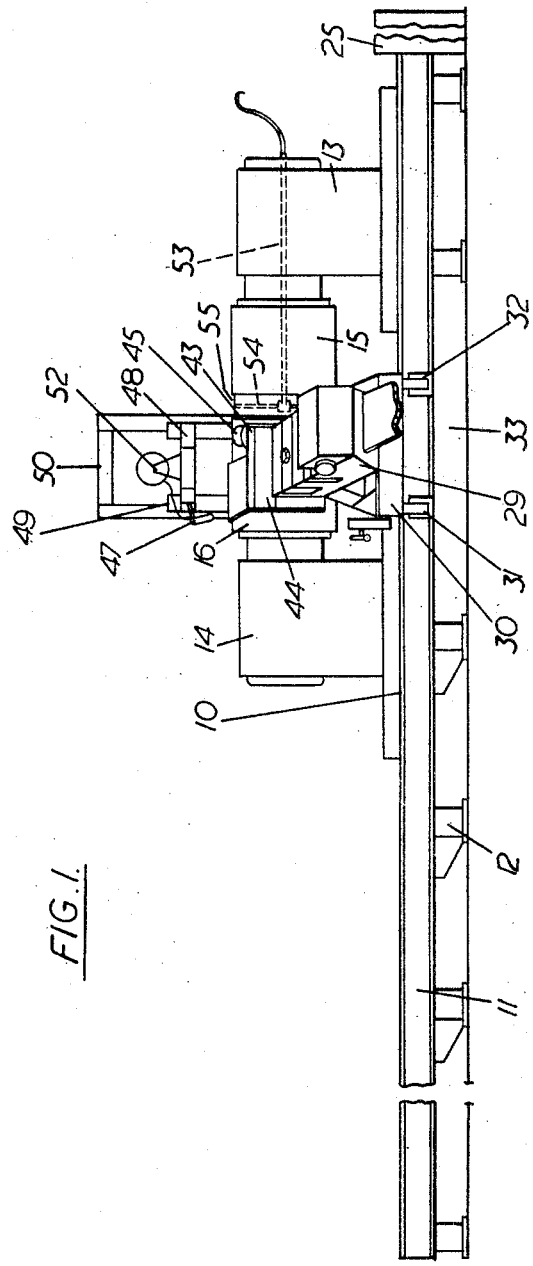
FIGURES 1 and 2 are a side elevation and plan of one apparatus.

The apparatus 10 shown in FIGURES 1 to 5 has a rigid bed 11 which may be supported at a convenient height by pillars 12, or directly supported from concrete foundations. Mounted on guideways on the bed 11 are a headstock 13 and a tailstock 14. Between the headstock 13 and the tailstock 14 are a headstock mandrel 15 and a tailstock mandrel 16.

A mandrel shaft 17 drives the headstock mandrel 15 and the tailstock mandrel 16 via pulleys housed within drive pick-up arms 18, 19 mounted on the headstock 13 and tailstock 14 respectively. The pulley in each pick-up arm slides on the mandrel shaft 17 but is keyed to a keyway which extends the entire length of the mandrel shaft. The drive is then transmitted to the headstock or tailstock mandrels 15, 16 by a belt drive and a worm gear situated in the headstock or tailstock.

The headstock 13 is capable of limited movement lengthwise along the bed 11 of the apparatus under the action of a pneumatic or hydraulic headstock jack 20, having a cylinder 21 anchored to the bed 11 at 22 and a ram 23 coupled to the headstock 13 by a coupling device 24. Positive stops are fitted to limit this movement to suit the strip being wound. The headstock mandrel 15 is detachably journalled on the headstock 13 so that it moves lengthwise along the machine with the headstock.

At the headstock end of the machine are situated electric motors, variable ratio drives and clutches, indicated by the block 25. These provide the drive to the mandrel shaft 17 and to a leadscrew 26.

The leadscrew 26 meshes with a lead nut 68 which is secured to the tailstock 14 so that rotation of the leadscrew 26 moves the tailstock one way or the other along the bed 11 of the apparatus. The tailstock mandrel 16 is detachably journalled on the tailstock so that it moves with the tailstock.

The leadscrew 26 and also the mandrel shaft 17 extend the whole length of the apparatus and at intervals throughout their length are supported by bearings 27, 28 respectively. These bearings are mounted in counterbalanced supports which tilt clear of the shaft when either the nut on the tailstock or the drive pick-up arms pass along.

To one side of the apparatus 10 is a strip guide 29. A frame 30 is pivoted at one end at 31, 32 to a fixed base 33, whilst an electrically-operated screw jack 34 is connected at 35 to the other end of the frame. The housing of the jack 34 is mounted on trunnions 36 from the fixed base 33 to allow the jack to pivot as it is extended or retracted. This jack 34 allows adjustment of the guide 29 for the size of mandrel to be used. It follows that the amount of strip 39 wrapped round the mandrels before welding takes place can be varied to suit the different thicknesses of metal being formed.

Mounted on the frame 30 is a guide unit 37 consisting of rollers 38 and side guards defining a path for strip approaching the mandrels tangentially at an appropriate helix angle. The strip is led between the rollers, and at least one of the rollers is adjustable on the frame to vary as desired the tension given to the strip 39. The adjusting screws are shown at 40. Powered rollers, driven by an electric motor 41, are used to feed the strip 39 through to the mandrels prior to the start of the operation.

Figure 2:
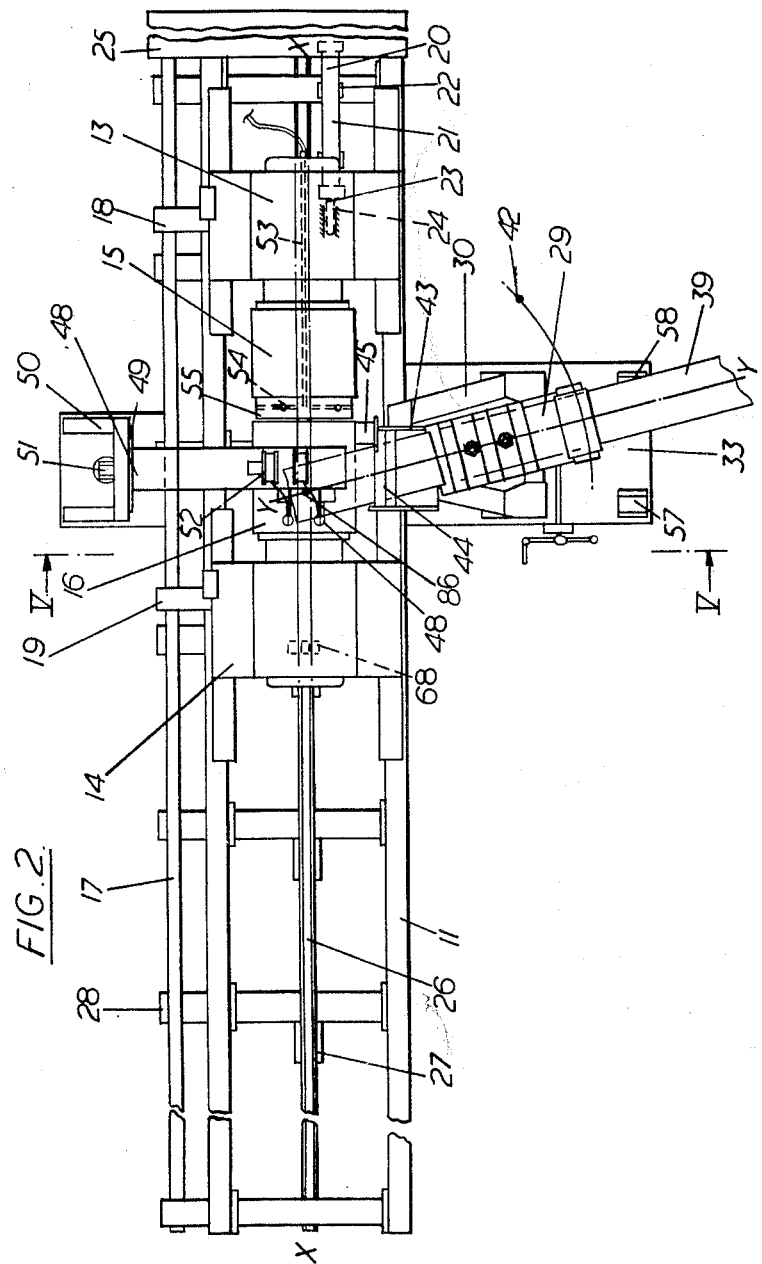

The whole unit 37 is rotatable relative to the frame 30 in a circular arc 42 whose axis of rotation, shown at 86 in FIGURE 2, is the intersection of the vertical plane containing the horizontal axis XX of the mandrels and the vertical plane containing the centre line YY of the strip 39 as it is guided into the machine.

Figure 5:
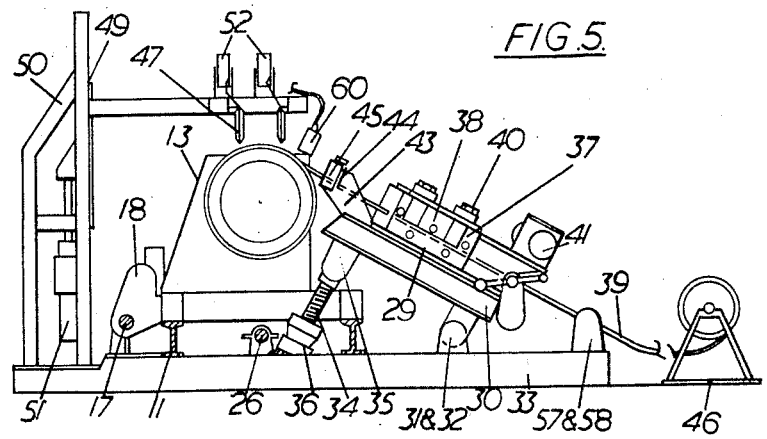
FIGURE 5 is a section on the line V—V in FIGURE 2.

Strip to be fed to the machine is stored in a coil on a stand 46 situated at a convenient distance from the machine, as shown in FIGURE 5.

A further roller unit 43 is positioned between the rollers 38 and the mandrels 15 and 16 adjacent to the point of tangency of the strip with a mandrel. The axis of the final roller 44 in this unit is parallel to the axis XX of the mandrels and is adjustable to and from the axis XX. Mounted on this roller unit 43 is a pneumatically powered grinding tool 45 which is used to sever the strip 39.

Twin welding devices 47 are mounted on an arm 48 above the normal operating position of the headstock mandrel 15. The welding devices 47 are adjustable individually, and also the arm 48 is able to be raised or lowered by a pneumatic or hydraulic jack 51. The arm 48 moves in guides 49 on the framework 50.

The welding devices used in apparatus according to this invention may be of any type suitable for welding the material of the strip. In the present example a known process of electric arc welding is employed in which welding wire is fed continuously from coils 52 mounted on the arm 48. Argon gas is ducted over the electrodes above the weld and also ducted to shield the underside, by the following means.

In FIGURES 1 and 2 a tube 53 is shown passing through the headstock 13 meeting several radial holes 54 in the headstock mandrel 15. These duct the argon gas to an annular groove 55 in the surface of the headstock mandrel 15 directly under the welding position. The weld is thus completely shielded from the atmosphere.

The welding devices 47 may be used singly or together depending on the thickness of the material to be welded.

In use, a headstock mandrel 15 and a tailstock mandrel 16, whose external diameters are that of the tube to be wound, are mounted on the headstock 13 and tailstock 14 respectively. The drive ratios to the mandrel shaft 17 and the leadscrew 26 are selected so that their relative speeds of rotation and the rate of feed from the leadscrew will cause the tailstock mandrel 16 to be rotated and traversed axially at rates which will produce the correct helix angle on the tube to be wound. The headstock mandrel 15 is rotated simultaneously with the tailstock mandrel 16 but is not traversed by the leadscrew 26.

The headstock jack 20 is retracted so that the headstock 13, and hence the headstock mandrel 15, are moved to the loading position shown in FIGURES 1 and 2. The tailstock mandrel 16 is then moved towards the headstock mandrel 15 until the two abut together.

A coil of the strip 39 to be wound and welded into a tube is mounted in the stand 46, and the strip is fed through the guide unit 37 to the roller unit 43 and then is secured, by a set screw 56, to the tailstock mandrel 16. The position of the final roller 44 is adjusted so that it forces the strip to be in contact with the mandrel evenly over its full width.

The pneumatic or hydraulic pressure to the headstock jack 20 is then applied causing the jack to tend to extend, and the mandrel shaft 17 and leadscrew 26 are set in rotation. The rotation of the leadscrew causes the tailstock mandrel 16 to move to the left in FIGURES 1 to 4. The headstock mandrel 15 and the tailstock mandrel 16 are rotated by the mandrel shaft 17, and also, because of the pressure exerted by the headstock jack 20 the headstock mandrel is moved axially in continued contact with the tailstock mandrel. This joint rotation and longitudinal movement of the two mandrels winds a few turns of the strip 39 onto the tailstock mandrel and then onto the headstock mandrel.

Figure 3:
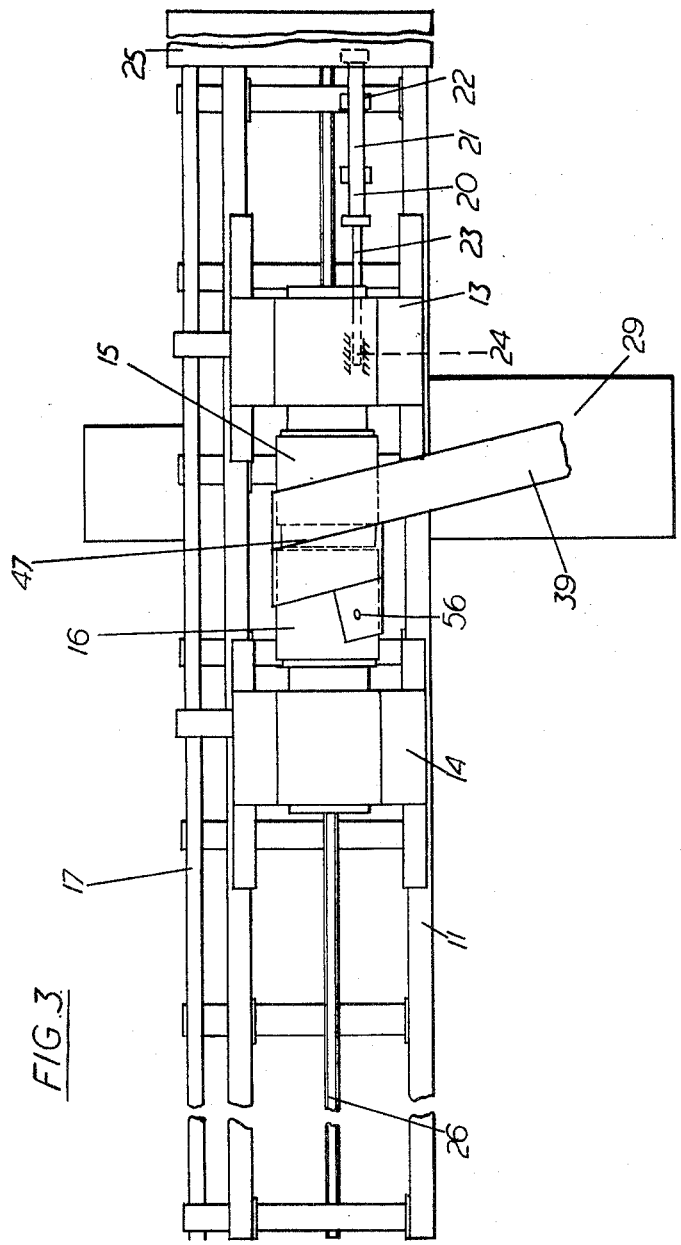
FIGURES 3 and 4 are diagrams in plan of two stages during winding.

The welding device 47 is brought into use as soon as one revolution has been made, but it is only when the weld occurs over the annular groove 55 in the headstock mandrel 15 that the weld is completely shielded by argon and a really strong joint is made. The headstock 13 reaches the limit of its axial travel at this point and is stopped by an automatic stop, which is pre-adjusted to give the correct operating position. This position is shown in FIGURE 3.

Figure 4:
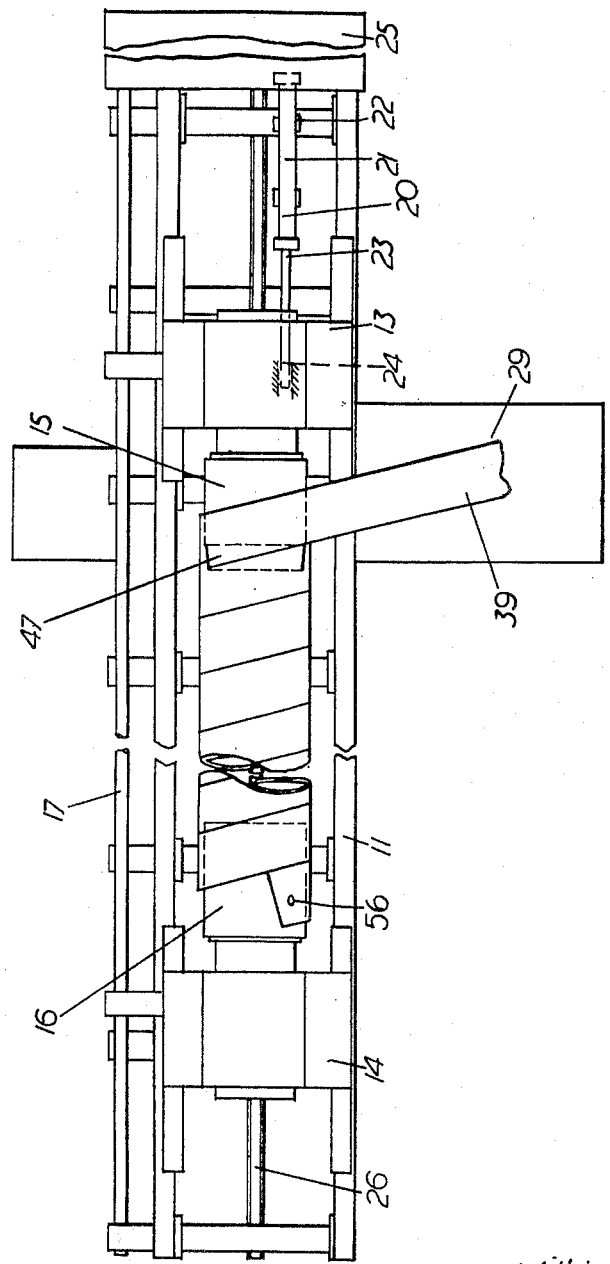

As the operation continues, the headstock mandrel 15 continues to rotate, but has no further axial movement. The tailstock mandrel 16, however, continues to rotate and also to move along the bed away from the headstock mandrel 15, and in doing so pulls off the welded tube from the headstock mandrel whilst strip continues to be wound on to the headstock mandrel for welding, as shown in FIGURE 4. That is to say the strip slides axially off the headstock mandrel.

When the length of tube required has been made, the apparatus is stopped, the welding devices 47 are raised clear of the tube, and the strip 39 is severed from the tube by the grinding tool 45.

The tube is then supported by an overhead crane or by fork lift truck whilst the headstock and tailstock mandrels are withdrawn axially from it. The tube is then lifted clear of the machine. The initial coils of the tube, i.e. those with substandard welding, are removed and the tube ends trimmed.

Figure 6:
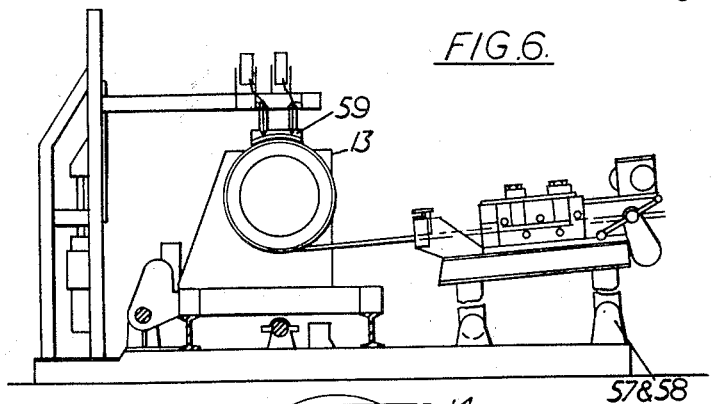
FIGURE 6 is a section similar to FIGURE 5 of an alternative arrangement.

As an alternative, as shown in FIGURE 6, the strip 39 may be fed under the mandrels 15 and 16. The strip guide 29 is repositioned on alternative pivot points 57, 58 but is adjusted for operation in a similar manner as before.

In this case it may be necessary to fit a stationary guide shoe 59 to the headstock 13. This guide shoe 59 has a flange which overlaps and follows the contour of the headstock mandrel 15 and which has the same angular inclination as the helix angle at which the strip is to be wound. The flange engages the free edge of the first turn of strip on the headstock mandrel, once the headstock mandrel has reached its normal position, and thus the guide shoe 59 serves as an additional means for maintaining the correct helix angle and pushing the wound and welded strip off the headstock mandrel. Alternative flanges are required for different diameters of mandrel and for different helix angles.

Figure 7:
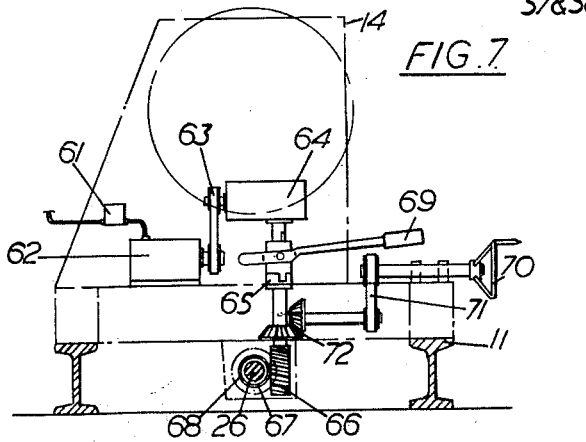
FIGURE 7 is an enlarged cross section of the tailstock, showing a modification.

The gap between successive turns of strip as they come under the welding devices 47 must be accurately controlled to ensure a uniform weld. FIGURE 7 shows a mechanism designed to achieve automatic gap control.

A sensing device 60 (FIGURE 5) is positioned over the gap between the adjacent coils just in advance of the welding position. This sensing device 60 provides a signal which is a measurement of the gap, or of any change in gap width, between the successive coils at this point. This signal is passed to a servo mechanism 61 which controls the rotational speed of an electric motor 62. The drive from the motor 62 is via a V belt 63, reduction gear 64, clutch 65, worm 66 and worm gear 67. The worm gear 67 is integral with, or keyed to, the lead nut 68 of the lead screw 26.

Rotation of the lead nut 68 relative the tailstock 14 will, according to its direction of rotation, either increase or decrease the rate of axial travel of the tailstock 14, in relation to the speed directly derived from the speed of rotation of the leadscrew 26.

To allow the electric motor 62 to rotate in one direction only, the drive to the leadscrew 26 is selected to give the leadscrew a rotational speed greater than the correct speed required. This has the effect of increasing the rate of travel of the tailstock 14. The electric motor 62 rotates the lead nut 68, through the mechanism described, slowly in the same direction as the lead screw 26, thus having the effect of slowing the tailstock 14 to its correct rate of travel.

It follows that by simply varying the speed of the electric motor 62, in accordance with the signals received from the sensing device 60, deviations in gap width from a predetermined size may be counteracted, and thus a substantially constant gap width may be maintained between the edges of successive coils as they approach the welding devices 47.

The lead nut 68 may be operated manually by a handle 70 via a belt 71 and a bevel gear 72. In this case the electric motor 62 may be disengaged by operating a clutch 65 by means of a lever 69.

Figure 8:
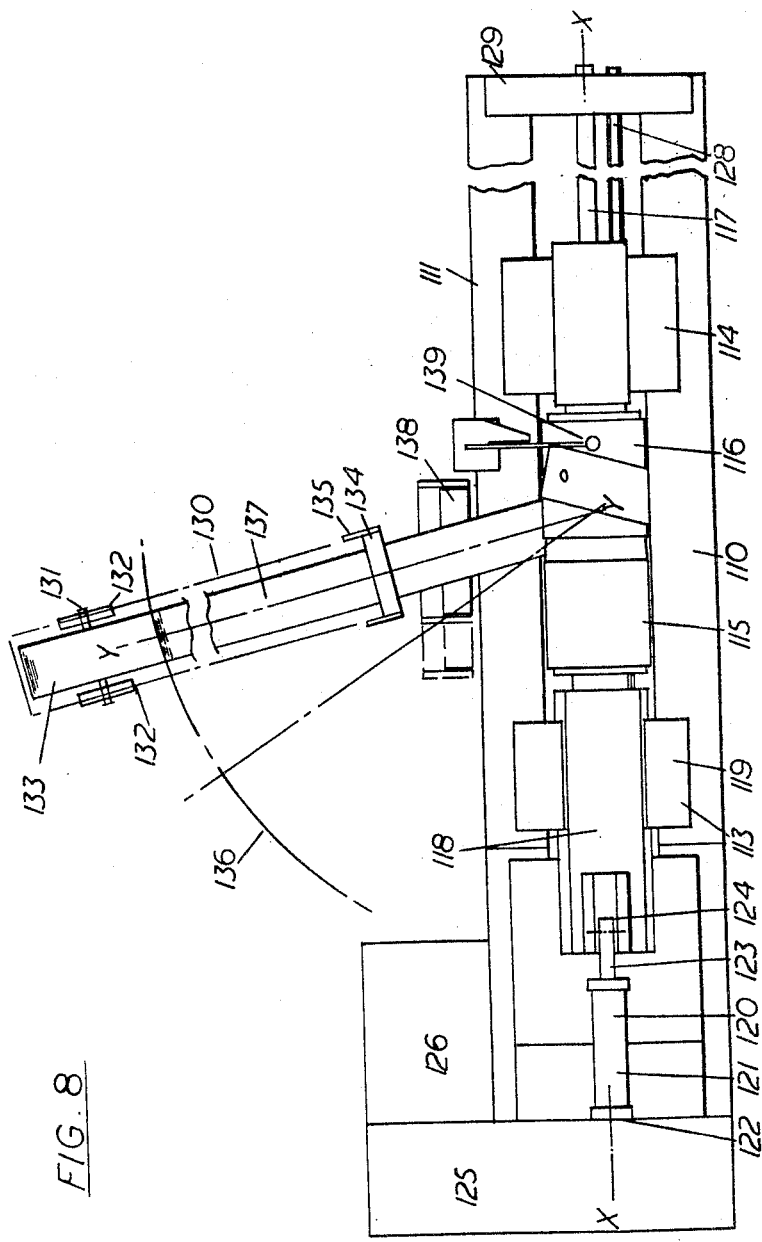

A smaller apparatus is illustrated in FIGURES 8 and 9. Due to the smaller diameters of tube to be wound and welded, certain features have been simplified.

This apparatus 110 has a rigid frame 111 which is supported at a convenient height by pillars 112. Secured to the frame 111 is a headstock 113 and also mounted on guide-ways on the frame 111 is a tailstock 114. Between the headstock and the tailstock are a headstock mandrel 115 and a tailstock mandrel 116. The headstock mandrel 115 and the tailstock mandrel 116 each have a key which is a sliding fit in a keyway extending the whole length of a mandrel shaft 117, and are thus capable of being rotated by and sliding along the mandrel shaft.

Coupled to the headstock mandrel 115 is a sliding member 118 which is slidably supported in guideways in a supporting block 119, so as to be movable axially in either direction with respect to the longitudinal axis of the machine by means of a hydraulic or pneumatic jack 120 having a cylinder 121 anchored at 122 to a part of the headstock and a ram 123 coupled to the sliding member 118 by a coupling device 124.

At the headstock end of the machine are casings 125, 126 which contain motors, variable ratio gearing and clutches through which driving connections are made to the mandrel shaft 117 and the leadscrew 128.

The leadscrew 128 meshes with a nut which is secured to the tailstock 114, so that rotation of the leadscrew moves the tailstock one way or the other along the bed of the machine. The tailstock mandrel 116 is coupled to the tailstock 114 so that it moves lengthwise along the machine with the tailstock 114. The mandrel shaft 117 and the leadscrew 128 extend through the tailstock 114 and are supported by bearings from a shaft support member 129.

To one side of the machine 110 is the strip storage and feeding mechanism. This consists of a supporting frame, indicated by a block 130, on which are mounted a shaft 131 supported from side frames 132 to carry a coil of strip 133. The supporting frame also carries guide rollers 134 and side guards 135. All of these parts are mounted in the frame 130 and are rotatable with it on rollers engaging in a track 136 which is a circular arc whose axis of rotation, as shown in FIGURE 8, is the intersection of a vertical plane containing the axis XX of the mandrels, and a vertical plane containing the centre line YY of the strip 137 as it is fed from the coil 133 to the machine. A final roller 138 is positioned between the guide rollers 134 and the machine. The axis of the final roller 138 is parallel to the axis XX of the mandrels, and is adjustable.

A welding device 139 is mounted above the normal operating position of the headstock mandrel. This welding device is adjustable for height as well as axially and laterally relative to the machine. Argon is ducted over the electrode to one side of the weld, and through ducts in the mandrel shaft 117 and in the headstock mandrel 115 to the other side of the weld.

The sequence of operation is similar to that described in connection with the apparatus shown in FIGURES 1 to 5. The mandrel shaft 117, however, must be detached from the machine, before the finished tube can be removed.

We claim:

1. Apparatus comprising a headstock mandrel and a tailstock mandrel which are coaxial cylinders of equal diameter, means for positively rotating the tailstock mandrel and means for positively moving the tailstock mandrel axially, means enabling the headstock mandrel to rotate, means for positively imparting limited axial movement to the headstock mandrel, an anchorage on the tailstock mandrel for the end of a metal strip, a guide for strip approaching the headstock mandrel, and a welding device adjacent to a normal position of the headstock mandrel for forming a continuous seam weld between the adjacent edges of successive helical turns of strip.

2. Apparatus according to claim 1 including means for continuously detecting the width of the gap between successive helical turns of strip in advance of the welding device, and means responsive to the detecting means for counteracting deviations of the width from a predetermined size by varying the speed of axial movement of the tailstock mandrel.

3. Apparatus according to claim 2 in which the tailstock mandrel is moved axially by a nut engaged with a rotary leadscrew, and there is means for rotating the nut slowly at variable speed in one direction to vary the speed of axial movement of the tailstock.

4. Apparatus according to claim 1 including a roller adjacent to the point of tangency of the strip with a mandrel, the roller having its axis parallel to the axis of the mandrels.

5. Apparatus for forming a tube comprising a headstock mandrel and a tailstock mandrel which are coaxial cylinders of equal diameter, means for positively rotating the tailstock mandrel, means for positively moving the tailstock mandrel axially along a first path, means for mounting the headstock mandrel for rotation, means for positively moving the headstock mandrel for movement along a second path shorter than the first path between a starting position and a normal position, the normal position being at the end of the second path nearest the tailstock mandrel, said first path including a portion in which the tailstock mandrel is adjacent to the starting position of the headstock mandrel, an anchorage on the tailstock mandrel for the end of a strip, a guide for strip approaching the headstock mandrel and a welding device adjacent to the normal position of the headstock mandrel for forming a continuous seam weld between the adjacent edges of successive helical turns of strip being wound on said mandrels.

References Cited by the Examiner

UNITED STATES PATENTS

| 344,350   | 6/86  | Coas          | 113—35 |
| 2,059,578 | 11/36 | Henning       | 113—35 |
| 2,729,180 | 1/56  | Freeze        | 113—35 |
| 3,038,832 | 6/62  | Carlson et al.| 93—80  |

FOREIGN PATENTS

| 143,343 | 5/20 | Great Britain. |
| 231,665 | 5/59 | Australia. |
| 483,995 | 8/53 | Italy. |

OTHER REFERENCES

Mueller: Abstract of application Serial Number 134,286, published 671 O.G. 1498 (June 30, 1953).

CHARLES W. LANHAM, *Primary Examiner.*

NEDWIN BERGER, *Examiner.*